US008768953B2

(12) United States Patent
Pan et al.

(10) Patent No.: US 8,768,953 B2
(45) Date of Patent: Jul. 1, 2014

(54) METHOD AND SYSTEM FOR DETERMINING NODE TO BE MATERIALIZED

(75) Inventors: Yue Pan, Beijing (CN); Xing Zhi Sun, Beijing (CN); Lin Hao Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 12/913,570

(22) Filed: Oct. 27, 2010

(65) Prior Publication Data
US 2011/0106843 A1  May 5, 2011

(30) Foreign Application Priority Data

Oct. 30, 2009  (CN) .......................... 2009 1 0211314

(51) Int. Cl.
*G06F 7/00* (2006.01)

(52) U.S. Cl.
USPC .......................................................... 707/769

(58) Field of Classification Search
None
See application file for complete search history.

(56) References Cited

U.S. PATENT DOCUMENTS

| 6,408,291 | B1 | | 6/2002 | Skeen | |
|---|---|---|---|---|---|
| 7,047,260 | B1 | * | 5/2006 | Fink | 1/1 |
| 7,613,602 | B2 | * | 11/2009 | Kanawa | 704/9 |
| 2008/0270346 | A1 | * | 10/2008 | Mehta et al. | 707/2 |

FOREIGN PATENT DOCUMENTS

| CN | 1851696 | 10/2006 |
|---|---|---|
| CN | 101510204 | 8/2009 |
| WO | WO2008016878 | 2/2008 |

OTHER PUBLICATIONS

Thomas Neumann, "Efficient Generation and Execution of DAG-Structured Query Graphs," Dissertation, Mannheim U. 2005.
Amol Deshpande, et al. "Adaptive Query Processing". Foundations and Trends in Databases vol. 1, No. 1 (2007) 1-140.
Deri, "Design and proof-of-concept implementation of the InContext context reasoning techniques V1". FP6-034718, inContext, D2.3V 1.0, 2007.
Nuno Lopes, et al. "Contextual Logic Programming for Ontology Representation and Querying". CEUR Workshop Proceedings, vol. 287, paper 10, 2007.
Jian Zhou, et al. "Minerva: A Scalable OWL Ontology Storage and Inference System". Lecture Notes in Computer Science,vol. 4185, 2006.
Mourad Ouzzani, et al. "Query Processing and Optimization on the Web". 2004 Kluwer Academic Publishers.

* cited by examiner

*Primary Examiner* — Apu Mofiz
*Assistant Examiner* — Thu Nga Nguyen
(74) *Attorney, Agent, or Firm* — Gail H. Zarick; Otterstedt, Ellenbogen & Krammer, LLP (57) ABSTRACT

A dependency graph of rule predicates without strongly connected sub-graph is obtained. The dependency graph indicates the dependency among the rule predicates. An update frequency of node in the dependency graph is calculated, and a query frequency of node in the dependency graph is also calculated. Furthermore, a runtime query cost value and a materialization cost value of the node are calculated based on the query frequency and update frequency. Node to be materialized are determined based on the runtime query cost value and the materialization cost value. A rule predicate corresponding to the node to be materialized is the rule predicate to be materialized. In at least some instances, an exemplary technical effect is that the return time of result of runtime query is saved and the affect by the data update is reduced when a query is performed in relation data reasoning system constructed with rule predicates.

2 Claims, 8 Drawing Sheets

| rule predicate or dummy node | frequency | single pre-evaluation cost value Ce | single query cost value Cq | runtime query cost value Eq | materialization cost value Em | materialization benefit Eq-Em |
|---|---|---|---|---|---|---|
| dummy node n1 | (1, 6) | 50 timerons | 30 timerons | 180 | 100 | 80 |
| Large claim contract | (5, 5) | 60 timerons | 55 timerons | 275 | 360 | -85 |
| dummy node n3 | (6, 4) | 15 timerons | 10 timerons | 40 | 105 | -65 |
| VIP customer reassessment | (14, 1) | 65 timerons | 65 timerons | 65 | 975 | -910 |

METHOD AND SYSTEM FOR DETERMINING NODE TO BE MATERIALIZED

CROSS-REFERENCE TO RELATED APPLICATION(S)

This application claims foreign priority to P.R. China Patent application 200910211314.5 filed 30 Oct. 2009, the complete disclosure of which is expressly incorporated herein by reference in its entirety for all purposes.

FIELD OF THE INVENTION

The present invention relates to database query and rule reasoning system, and particularly to a technology of determining node to be materialized in a reasoning system.

BACKGROUND OF THE INVENTION

As relation database is developed, a large amount of data can be stored in database in a manner of relation form. How to employ these data efficiently has become a subsequent development trend in the data management field. In commercial intelligent application, corporation needs to process and analyze existing data to help the corporation make advisable decisions for operation and working. Basic query supported on relation database can't answer some complex questions in decision-making, and the organization of data is with respect to storage in lower layer but not application in upper layer. For example, basic table of database only defines one about "customer" and "contract," and also defines some rules on these basic tables, such as "what customer belongs to high value customer" or "what contract belongs to unhealthy contract." Then, when corporation wants to query "high value customer" or "unhealthy contract" according to data in database system, one can't query such unintuitive concepts in relation database and has to use reasoning system to solve such problem properly since there is no item of "high value customer" or "unhealthy contract" in basic table of database. The base of reasoning system is first order logic (also referred to symbolic logic). Relation database may be extended flexibly and more complex query can be supported by incorporating logic operation into relation database.

In reasoning system, user defines new predicate by rule on relation database. Object that can exist independently (subject, accusative, etc. in clause) is referred to object word or individual word, and predicate is referred to a word used to characterizing object or relationship between objects. Basic table in the above can be referred to basic predicate, and rule defined on basic table (basic predicate) can be referred to rule predicate. It is desirable to solve logic relation in rules by means of a system with reasoning capability since a query of predicate defined by rule can't invoke the query language in database.

Currently, there are two methods for reasoning in the art, runtime reasoning and materialization-based reasoning. The runtime reasoning means that reasoning is performed in runtime query. The materialization-based reasoning means that all reasoning results are calculated beforehand and stored in relation table. They have different advantages and disadvantages. Specifically, the advantage of the former is that the reasoning result isn't needed to be calculated beforehand and it doesn't be affected by data update, but the disadvantage is that it takes a long time to answer the query since the query result can only be returned through reasoning after a query request is received. The advantage of the latter is that it doesn't need to calculate reasoning result during runtime data query, and the query result can be obtained by using directly pre-calculated reasoning result, and the return time of result of runtime query can thus be saved. However, its disadvantage is faced with data update, that is, when data is updated, the reasoning results calculated beforehand have to be calculated again.

SUMMARY OF THE INVENTION

Principles of the invention provide techniques for determining node to be materialized.

According to an aspect of the invention, a method for determining rule predicates to be materialized is provided, including: obtaining a dependency graph of rule predicates without strongly connected sub-graph, wherein the dependency graph indicates the dependency among the rule predicates; calculating an update frequency of nodes in the dependency graph; calculating a query frequency of nodes in the dependency graph; calculating a runtime query cost value and a materialization cost value of the nodes based on the query frequency and update frequency; and determining at least one node to be materialized based on the runtime query cost value and the materialization cost value, wherein a given one of the rule predicates, corresponding to the at least one node to be materialized, is the rule predicate to be materialized.

In an embodiment of the invention, the method for determining node to be materialized further includes: obtaining original dependency graph of the rule predicates; and replacing a strongly connected sub-graph in the original dependency graph with a dummy node to obtain the dependency graph of rule predicates without strongly connected sub-graph.

According to another aspect of the invention, a system for determining rule predicates to be materialized is provided, including: dependency graph obtaining means for obtaining a dependency graph of rule predicates without strongly connected sub-graph, wherein the dependency graph indicates the dependency among the rule predicates; update frequency calculating means for calculating an update frequency of nodes in the dependency graph; query frequency calculating means for calculating a query frequency of nodes in the dependency graph; cost value calculating means for calculating a runtime query cost value and a materialization cost value of the nodes based on the query frequency and update frequency; and materialization determining means for determining at least one node to be materialized based on a difference of the runtime query cost value and the materialization cost value of the node, wherein a given one of the rule predicates corresponding to the at least one node to be materialized, is the rule predicate to be materialized.

In an embodiment of the invention, the dependency graph obtaining means is further configured to: obtain original dependency graph of the rule predicates; and replace a strongly connected sub-graph in the original dependency graph with dummy node to obtain the dependency graph of rule predicates without strongly connected sub-graph.

Techniques of the present invention can provide substantial beneficial technical effects. For example, in one or more embodiments, rule predicate generated over basic predicates of the relation database can be reasoned by selectively applying runtime reasoning method and materialization reasoning method, such that a technical effect that the return time of result of runtime query is saved and it doesn't be influenced by the data update.

These and other features and advantages of the present invention will become apparent from the following detailed description of illustrative embodiments thereof, which is to be read in connection with the accompanying drawings.

BRIEF DESCRIPTION OF THE DRAWINGS

In the drawings, the same reference numbers refer to the same or similar elements.

DETAILED DESCRIPTION OF PREFERRED EMBODIMENTS

In the below, methods and systems for determining node to be materialized provided by the invention will be described in detail by embodiments with reference to accompanying drawings.

One or more embodiments of the invention provide a method and system for determining node to be materialized. One or more embodiments of the invention use a novel mixing reasoning mode, wherein those rule predicates that should be materialized are selected by cost model (those rule predicates that should be materialized is a part or all of the total rule predicates), and the reasoning results of those rule predicates are materialized, thereby making the reasoning system improve query efficiency, and also effectively controlling maintenance operation due to update. If such a reasoning engine based on mixing reasoning mode is introduced into current commercial intelligent software, in one or more embodiments, the performance of the system will be improved significantly. One or more embodiments thus save the return time of result of runtime query and are not influenced by the data update.

Figure 1:
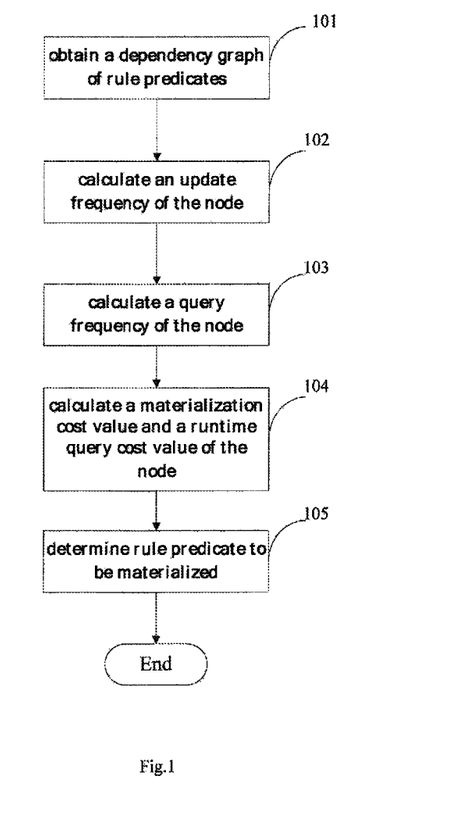
FIG. 1 shows a flow graph of a method for determining node to be materialized according to an embodiment of the invention.

FIG. 1 shows a flow graph of a method for determining node to be materialized according to an embodiment of the invention. In FIG. 1, steps start from 101, a dependency graph of rule predicates is obtained. The dependency graph indicates dependency among the rule predicates in the reasoning system. For example, if the defined rule predicate "unhealthy contract" means "debt contract" that is overdue more than 3 months without payment and the defined rule predicate "unhealthy contract" means that payment state is "contract" "without payment," but "contract" is defined basic predicate (basic table) in relation database. The basic predicate (basic table) "contract" includes several columns, such as signed date, customer name, payment state etc. In this example, it can be seen from the defined rule, rule predicate "unhealthy contract" depends on rule predicate "debt contract," and this dependency can be embodied in the dependency graph. It also notes that, the dependency graph obtained in step 101, in at least some instances, doesn't contain strongly connected sub-graph. The strongly connected graph is a graph in which there are paths from v1 to v2 and from v2 to v1 between any two nodes v1, v2 in a directed graph. The strongly connected graph can be simply understood as loop-shaped graph, and the strongly connected sub-graph in the reasoning system represents that there is dependency among rule predicates each other, and a loop is thus formed. The dependency graph obtained in step 101, in at least some instances, doesn't contain strongly connected sub-graph because there is dependency among rule predicates each other in strongly connected sub-graph, and transmissibility of dependency will result in that the reasoning system can't process a certain rule predicate independently during reasoning, and update and query frequency of rule predicate can't be directly calculated. If an original dependency graph containing strongly connected sub-graph is obtained, the original dependency graph has to be processed to obtain a dependency graph without strongly connected sub-graph, and the method for processing will be explained in FIG. 2 and the corresponding description. Those skilled in the art can understand that, a concept "graph" described in the invention (including dependency graph, strongly connected sub-graph etc) isn't necessarily an image in a form of node, directed edge, and it essentially embodies dependency among rule predicates. Any way for embodying such dependency identifiable by reasoning system falls into the scope of "graph" in the invention, for example, an expression "unhealthy contract:-debt contract" can be used to represent that rule predicate "unhealthy contract" depends on rule predicate "debt contract," and it doesn't need specific image necessarily.

Before the below description, the relation of "node" and "rule predicate" must be firstly determined. It should be understood that, in dependency graph, each of nodes has two possibilities, either it directly corresponds to rule predicate or is dummy node. The dummy node means a node replacing strongly connected sub-graph in dependency graph, and it isn't an independent rule predicate but an independent node in dependency graph. The dummy node substantially corresponds to one or more rule predicate nodes, and it is replaced with the dummy node only for removing strongly connected sub-graph. In fact, the node directly corresponding to rule predicate is rule predicate per se, but the dummy node corresponds to strongly connected sub-graph composed by one or more rule predicates. When node to be materialized is determined, it equals to a case that rule predicate to be materialized is determined if the node to be materialized is rule predicate per se; and it equals to a case that all rule predicates in strongly connected sub-graph replaced with dummy node are rule predicates to be materialized if the node to be materialized is dummy node. It should be understood that, only if node to be materialized is determined, it equals to that rule predicate to be materialized is determined. This part will be described in the description of FIG. 2.

Next, in step 102, an update frequency of the node is calculated by using the dependency graph. In step 103, a query frequency of the node is calculated by using the dependency graph. The update frequency and query frequency are both parameters needed for determining node to be materialized, and they don't have dependency between each other. Thus, the order of performing steps 102 and 103 isn't fixed, and each one can be performed earlier or later than another, even in parallel. The query frequency of node is calculated in step 103, because main drawback of applying runtime reasoning is that it is needed to reason newly while querying every time and then query result can be returned, in this way, if the query frequency of a certain rule predicate is high, it can affect the performance of the system due to reasoning many times as for the same query. Thus, the query frequency of node is considered as a parameter. The update frequency of rule predicate is calculated in step 102, because main drawback of applying materialization reasoning is that this method is after rule predicate or basic predicated is updated and the result materialization reasoned before isn't useful (otherwise errors occur), in this way, it is needed to perform materialization reasoning calculation newly. If the update frequency of a certain rule predicate is high, it can affect the performance of the system due to frequent materialization reasoning newly. Thus, the update frequency of node is considered as a parameter. The detailed embodiments of calculating update frequency and query frequency will be described in the description of FIG. 2.

Next, in step 104, a materialization cost value and a runtime query cost value are calculated based on the calculated query frequency and update frequency of node.

Finally, in step 105, node to be materialized is determined based on the calculated materialization cost value and runtime query cost value in step 104, and further rule predicate corresponding to the node to be materialized is determined.

Note "END" step not separately numbered.

Those skilled in the art should understand that, node to be materialized or rule predicate may be determined based on the materialization cost value and runtime query cost value by using many embodiments. For example, such rule predicate that materialization cost value is smaller than runtime query cost value is determined as node to be materialized, such node that a difference of runtime query cost value and materialization cost value is greater than a certain threshold is determined as node to be materialized, or such node that runtime query cost value is greater than a certain threshold (or materialization cost value is smaller than a certain threshold) is directly determined as node to be materialized. Specific method for determining node to be materialized can be selected depending on different reasoning system, database structure, if only these parameters of materialization cost value and/or runtime query cost value are taken into account during determination, which falls into the scope of the invention. Preferred embodiment of determining node to be materialized based on materialization cost value and runtime query cost value will be described in FIG. 2 and its corresponding description.

Thus, node to be materialized is determined. As for these nodes to be materialized, it is needed to be reasoned beforehand before runtime query, and the reasoned result can be directly used during the subsequent runtime query and don't need runtime reasoning, thereby improving return speed of query result. At the same time, using the method in the invention, rule predicate or node can be selectively (instead of all rule predicates or nodes) performed materialization reasoning, and this can also avoid disadvantage of frequent update of materialization reasoning result due to frequent data update.

Figure 2:
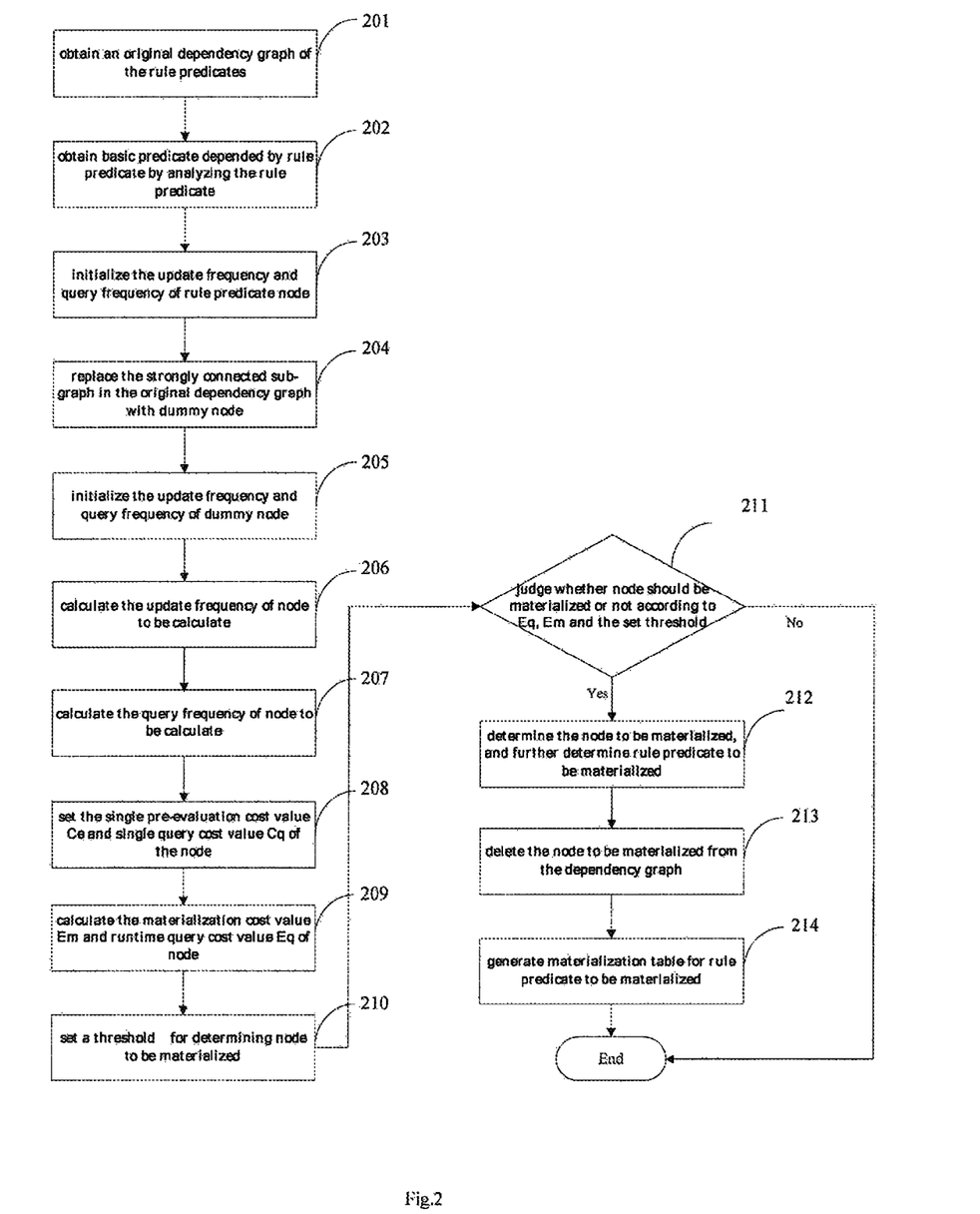
FIG. 2 shows a flow graph of a method for determining node to be materialized according to another embodiment of the invention.

Next referring to FIG. 2, FIG. 2 shows a flow graph of a method for determining node to be materialized according to another embodiment of the invention. Firstly, in step 201, an original dependency graph of rule predicates is obtained. The original dependency graph means such a dependency graph that is directly generated, and doesn't be amended according to condition semantics of defined rule predicates. Since there may be a large number of rule predicates defined on relation database and various condition semantics, the occurrence of loop dependency is inevitable. For example, assuming that "unhealthy contract" and "debt contract" are two rule predicates defined on relation database, "unhealthy contract" depends on "debt contract" if "debt contract that is overdue more than 3 months without payment is unhealthy contract" is defined. Further, "debt contract" depends on "unhealthy contract," if "all unhealthy contracts are debt contract" is defined. Thus, "unhealthy contract" and "debt contract" have mutual dependency, which leads to loop-shaped strongly connected sub-graph containing loop dependency in the original dependency graph. It is clear from the description of FIG. 1, a dependency graph without strongly connected sub-graph is obtained in step 101, and thus the original dependency graph with strongly connected sub-graph is needed to be processed in case that such original dependency graph is obtained in step 201.

Firstly, in step 202, basic predicate depended by rule predicate is obtained by analyzing the rule predicate. Basic predicate depended by rule predicate is analyzed, because rule predicate is updated necessarily while basic predicate depended by rule predicate is updated. Also, rule predicate is updated necessarily while other rule predicates depended by the rule predicate is updated. Since basic predicate depended by rule predicate isn't shown in dependency graph (only dependency among rule predicates is shown in dependency graph), basic predicate depended by rule predicate is obtained by analyzing rule predicate in step 202.

Next, the process proceeds to step 203. In step 203, the update frequency of rule predicate is initialized as the update frequency of basic predicate depended by the rule predicate. The query frequency of it is initialized as the query frequency per se. It should be noted that, the update frequency of basic predicate is obtained beforehand, and there may be many methods for obtaining the update frequency of basic predicate specifically. Preferably, the update frequency of each of basic predicates can be counted by reviewing database log. Optionally, it can be estimated according to application program.

In step 204, the strongly connected sub-graph in the original dependency graph is replaced with dummy node. That is, the strongly connected sub-graph is regarded as one node, and the directed edges within the strongly connected sub-graph don't be cared. In this way, the original dependency graph with the strongly connected sub-graph is converted into the original dependency graph without the strongly connected sub-graph (or, with dummy node), which is a dependency graph to be obtained in step 101. After step 204, the dependency graph of rule predicates without strongly connected sub-graph is obtained.

Next, in step 205, the update frequency and query frequency of dummy node are initialized as a sum of the initialized update frequency and query frequency of rule predicate contained in strongly connected sub-graph. Thus, the initialization of update frequency and query frequency of all nodes (including rule predicate node and dummy node) in dependency graph without strongly connected sub-graph is completed. Then, the update frequency and query frequency of each node (including rule predicate node and dummy node) in dependency graph may be calculated.

In step 206, the addition of the initialized update frequency of the node to be calculated and the initialized update frequency of other nodes on which are depended by the nodes to be calculated is treated as the update frequency of the nodes to be calculated, wherein the other nodes on which are depended by the nodes to be calculated includes other nodes on which are directly depended by the node to be calculated and other nodes on which are indirectly depended by the node to be calculated. The concepts of direct dependency and indirect dependency are described by means of examples below. For example, node A depends on node B, node B depends on node C, then it can be deemed that node B is a node directly depended by node A, but node C is a node indirectly depended by node A (based on transmissibility of dependency).

Figure 3A:
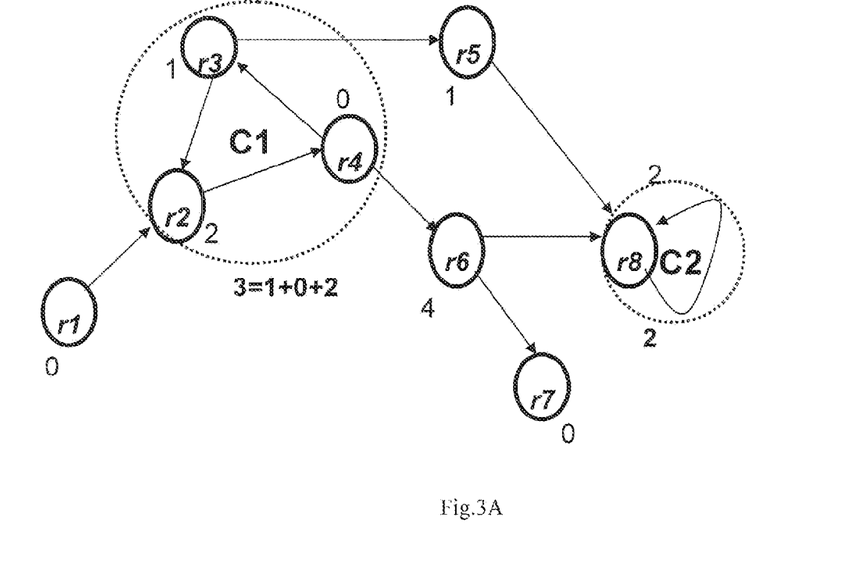
FIGS. 3A-3B show a schematic view of calculating an update frequency of node according to an embodiment of the invention.
Figure 3B:
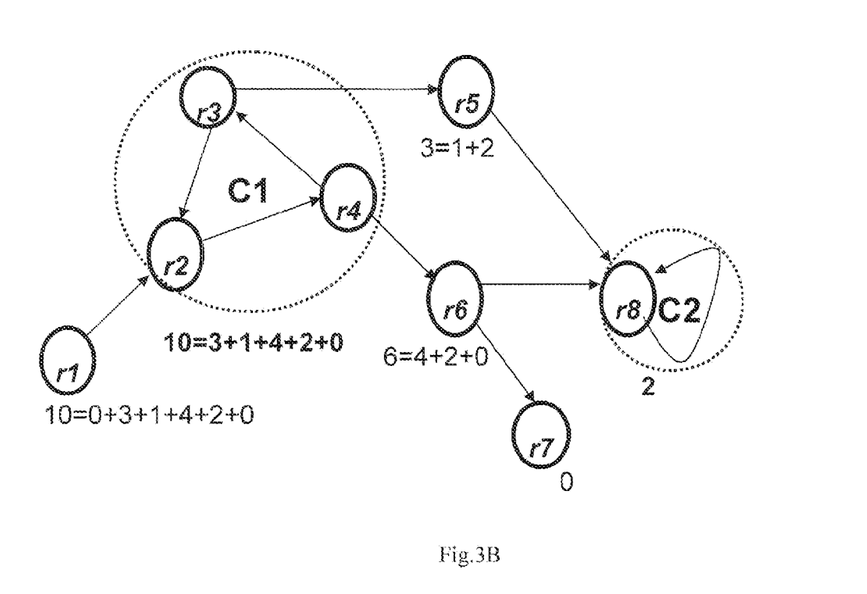

FIGS. 3A-3B show an example of a procedure of calculating the update frequency of node according to step 206. As shown in FIG. 3A, r2, r3 and r4 compose a strongly connected sub-graph, and r8 composes a strongly connected sub-graph too, thus dummy nodes C1 and C2 are used to replace these two strongly connected sub-graphs respectively. Then, respective node is initialized. It should be noted that, rule predicate and dummy node both belong to "node". The initialized update frequencies of r1 through r8 are 0, 2, 1, 0, 1, 4, 0, 2 respectively. Then, the update frequency of dummy C1 is further initialized as a sum of update frequencies of three nodes r2, r3 and r4, i.e. 3=1+0+2 (shown in bold in FIG. 3); the update frequency of dummy C2 is initialized as the update frequency of rule predicate r8, i.e. 2. The initialized update frequencies of each node are shown in FIG. 3A. Next, according to step 206, the update frequency of r6 is calculated as 4+2+0=6, the update frequency of r5 is 1+2=3, the update frequency of C1 is 3+1+4+2+0=10, and the update frequency of r1 is 0+3+1+4+2+0=10. The calculated update frequencies of each node are shown in FIG. 3B.

In step 207, the addition of the initialized query frequency of the node and the initialized query frequency of other nodes which depend on the node is treated as the query frequency of the node, wherein the other nodes which depend on the node includes other nodes which directly depend on the node and other nodes which indirectly depend on the node.

Figure 4A:
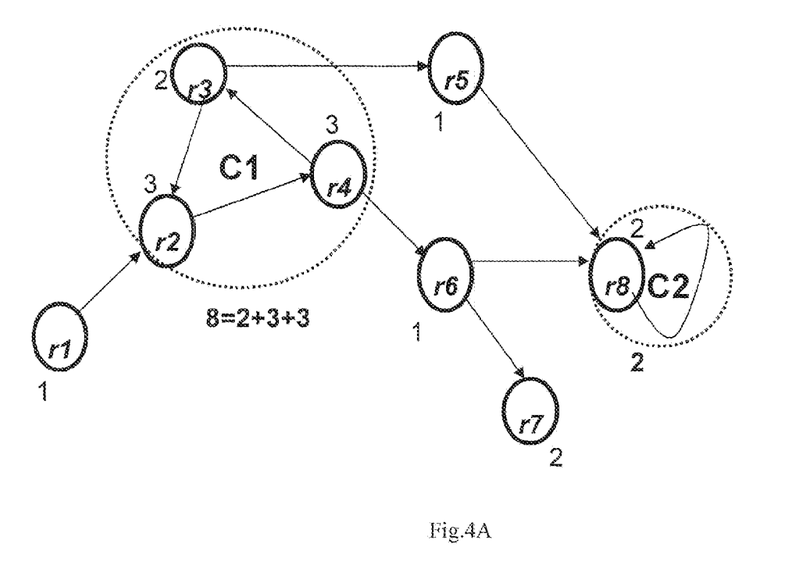
FIGS. 4A-4B show a schematic view of calculating a query frequency of node according to an embodiment of the invention.
Figure 4B:
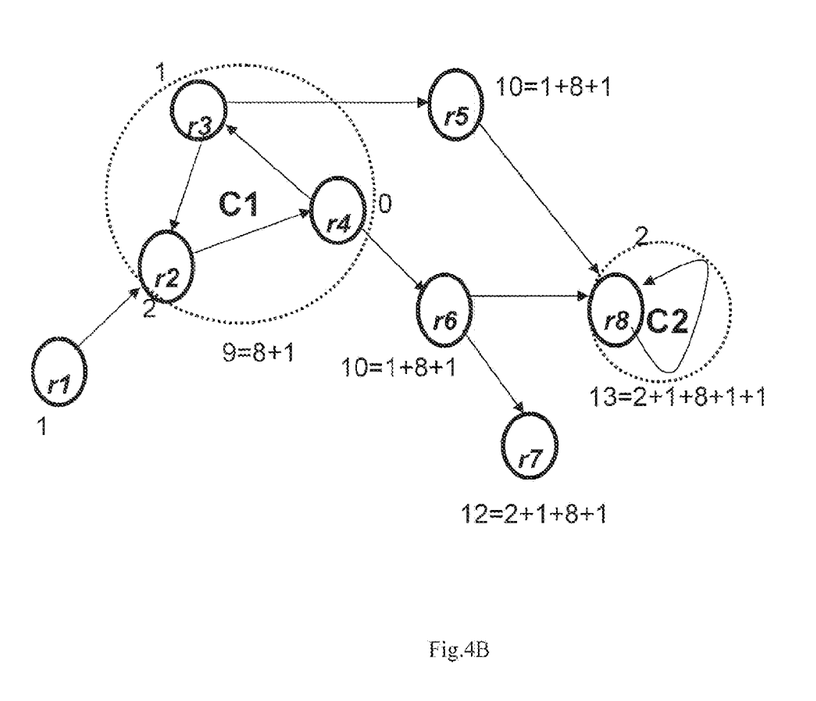

FIGS. 4A-4B show an example of a procedure of calculating the query frequency of node according to step 207. As shown in FIG. 4A, r2, r3 and r4 compose a strongly connected sub-graph, and r8 composes a strongly connected sub-graph too, thus dummy nodes C1 and C2 are used to replace these two strongly connected sub-graphs respectively. Then, respective node is initialized, and the initialized query frequencies of r1 through r8 are 1, 3, 2, 3, 1, 1, 2, 2 respectively. Then, the query frequency of dummy C1 is further initialized as a sum of query frequencies of three nodes r2, r3 and r4, i.e. 8=2+3+3 (shown in bold in FIG. 4A); the query frequency of dummy C2 is initialized as the query frequency of rule predicate r8, i.e. 2. The initialized query frequencies of each node are shown in FIG. 4A. Next, according to step 207, the query frequency of r6 is calculated as 8+1+1=10, the query frequency of r5 is 8+1+1=10, the query frequency of C1 is 8+1=9, the query frequency of r1 is 1, the query frequency of r7 is 2+1+8+1=12, the query frequency of r8 is 2+1+8+1+1=13. The calculated query frequencies of each node are shown in FIG. 4B.

In step 208, the single pre-evaluation cost value Ce and single query cost value Cq of the node are set. Single pre-evaluation cost value means a sum of costs of all processes with respect to database for calculating and materializing data corresponding to rule predicate. Single query cost value means a sum of costs of processes with respect to database for answering a single query on this predicate without materialization. The factors affecting pre-evaluation cost and query cost are the same as that affecting process cost in database, including size of basic table, whether index is created, histogram of some attributes on basic table etc. These are all factors used in prioritizing database query. It should be noted that, for an identical predicate, the single query cost is always smaller than single pre-evaluation cost. This is because all data corresponding to predicate is needed to be calculated and stored while pre-evaluating, while only related data is needed to be processed and queried while querying. For example, for a rule predicate Sub_Contract, the pre-evaluation cost is a cost of calculating all Sub_Contract(?x, ?y) and storing in materialization table. With respect to its query cost, since Sub_Contract of a certain contract is often to find in the application, such as Sub_Contract(?x, "ABC"), the contract regardless of "ABC" isn't needed to be involved during querying, thus the cost is small relatively. Those skilled in the art, any different method may be used to set single pre-evaluation cost value and single query cost value; pre-evaluation cost and query cost are both a sum of a series of database process costs; we can set these two cost values by evaluating according to evaluation for database operation costs. Optionally, if query and materialization occur in the system, we can obtain and set these two cost values directly from log in the system.

After the single pre-evaluation cost value Ce and single query cost value Cq of the rule predicate are set, in step 209, the materialization cost value Em of rule predicate or dummy node is calculated. Optionally, the materialization cost value Em can be calculated by using formula (1):

$$Em = Ce + n.UF * Ce \qquad (1)$$

wherein n.UF represents the update frequency of the node.

It can be seen from formula (1), pre-evaluation is needed after updating rule predicate every time except the first evaluation, thus n.UF represents the update frequency of the rule predicate or dummy node is used to multiply with single pre-evaluation cost value.

Optionally, runtime query evaluation value Eq can be calculated by using formula (2):

$$Eq = n.QF * Cq \qquad (2)$$

wherein n.QF represents the query frequency of the node.

It should be noted that, there is a term Ce used as an individual addend in formula (1) but there is no term Cq used as an individual addend in formula (2), because rule predicate is materialized after pre-evaluation is needed to perform once more, even if the update frequency is 0, when materialization cost value Em is calculated. However, runtime query cost value Eq is 0, if the query frequency is 0, when runtime query cost value Eq is calculated. Those skilled in the art should understand that, formula (1) and formula (2) are only embodiments for illustrating the calculation of Em and Eq, which don't means any limit to the invention. Those skilled in the art can use any method to calculate Em and Eq values, only if such method can embody the meanings of materialization cost value and runtime cost value, which falls into the scope of the invention.

In step 210, a threshold t for determining node or dummy node to be materialized is set. The function of the threshold is to judge whether a node is to be materialized or not. Specifically, there may be many methods for judging whether a node is to be materialized or not according values of Eq and Em and the set threshold. Preferably, the meaning of threshold t may be a prioritized value, that is, a comparison of Eq−Em value with threshold t, it means how much the query cost of the system for rule predicate reduces after materialization. Its unit is database operation cost timerons. The optional value of threshold t is: t>=0 timerons. For example, t=0 timerons. Optionally, the meaning of threshold t may be prioritized rate, that is, a comparison of (Eq−Em)/Eq and threshold t. The meaning of prioritized rate means the percent rate that the query cost of the system for rule predicate reduces after materialization. The optional value of threshold t as for prioritized rate is: 0<t<1, such as t=10%. Optionally, the meaning of threshold t may also be relative efficiency, that is, a comparison of Eq/Em and threshold t. The meaning of relative efficiency is an inverse of a ratio of the query cost of the system for rule predicate and cost in the original runtime query system after materialization (how many times the system efficiency after materialization is for the system efficiency without materialization=how many times the system performance is for the original). The optional value of threshold t as relative efficiency is: t>2, such as t=2 (the performance is 2 times for the original). It should be noted that, according to the concept of the invention, many meanings of threshold t can be designed, no matter what meaning the set threshold has, only if it is judged whether node should be materialized or not according to Em, Eq and threshold t, which falls into the scope of the invention. The operation modes of setting threshold t can be set by administrator according to his experience value, or be set by reviewing database access log, or be set by evaluation.

Next, in step 211, it is judged whether node should be materialized or not according to the set threshold t, Eq and Em values. If yes, the node to be materialized is determined, and rule predicate to be materialized in step 212 (otherwise proceed to END block, not separately numbered). Next, the node to be materialized is deleted from the dependency graph to generate a new dependency graph, as per 213. In this way, only new simplified dependency graph is needed to be reasoned in runtime during runtime querying, thereby simplifying the procedure of runtime reasoning and reducing the time for returning query result. As for those nodes or dummy nodes that are determined to be materialized, the calculated materialization reasoning results can be directly extracted during runtime querying, and such materialization reasoning results are stored in the materialization table generated for node or dummy node to be materialized in step 214. If a dummy node is determined as a node to be materialized, it is desirable to generate a materialization table for each of all rule predicates in strongly connected sub-graph corresponding to the dummy node, but not one materialization table is generated. It should be noted that, the materialization table generated in step 214 is different from temporary table generated during runtime querying. The temporary table for database management system DBMS is generated automatically during runtime querying, and is intended that some reasoning calculation results in the middle are generated and stored if the result can't be directly found in basic table of database, and such temporary tables can be cleared automatically after a query session is over. The materialization table generated in step 214 can't be cleared as a query session is over, and the materialization table exists persistently only if the materialized rule predicate doesn't be updated.

FIG. 5 shows a detailed embodiment for determining node and dummy node to be materialized according to an embodiment of the invention. The detailed embodiment will be described in detail below.

Assuming that the relation database defines 4 basic tables (basic predicates) as follows: Customer (customerID, name, customer information, important level, recommendater), Contract (contractID, contract content, customerID), Contract_Relationship (contractID1, contractID2, type), Claim (claimID, claim content, contractID, claim amount). The content between the brackets in the above 4 basic tables can be considered as columns contained in each basic table. Then, 4 rule predicates on the database are defined as follows: "Sub_Contract," "Large_Claim_Contract," "VIP_Customer," "VIP_Customer_Reassessment".

Specifically, rule predicate "Sub_Contract" is defined in two cases as follows: (1) if "type" in the basic table "Contract_Relationship" is listed as "Sub_Contract," the "Sub_Contract" relationship is composed by corresponding "contractID1" and "contractID2"; (2) if the "Sub_Contract" relationship is composed by contract 1 and contract 2 and the "Sub_Contract" relationship is composed by contract 2 and contract 3, the "Sub_Contract" relationship is composed by contract 1 and contract 3. The expressions for these two cases are respectively as follows:

Sub_Contract(?x,?y) :- Contract_Relationship(contractID1:?x, contractID2:?y, type: 'Subcontract')
Sub_Contract(?x,?y) :- Sub_Contract(?x,?z),Sub_Contract(?z,?y)

Rule predicate "Large_Claim_Contract" is defined in two cases as follows: (1) if the claim amount of a contract is larger than 5000, this contract is large claim contract; (2) the claim amount of sub-contract of a contract is larger than 5000, this contract is large claim contract. The expressions for these two cases are respectively as follows:

Large_Claim_Contract(?x) :- Claim(contractID:?x, claimAmount:?z), ?z>5000
Large_Claim_Contract(?x) :- Sub_Contract(?y, ?x), Claim(contractID:?y, claimAmount:?z), ?z>5000

Rule predicate "VIP customer" is defined in two cases as follows: (1) if the important level of a customer is "highest," this customer is VIP customer; (2) the customer recommended by VIP customer is also VIP customer. The expressions for these two cases are respectively as follows:

VIP_Customer(?x) :- Customer(customerID:?x, importanceLevel:"Highest");
VIP_Customer(?x) :- Customer(customerID:?x, recommendedBy:?y), VIP_Customer(?y);

Rule predicate "VIP Reassessment" is defined as follows: if a VIP customer is beneficiary of large claim contract, this VIP customer is needed to perform VIP customer reassessment. The expressions for this case are as follows:

VIP_Customer_Reassessment(?x) :- VIP_Customer(?x), Contract(contractID:?y, customerID: ?x); Large_Claim_Contract(?y)

Figure 5A:
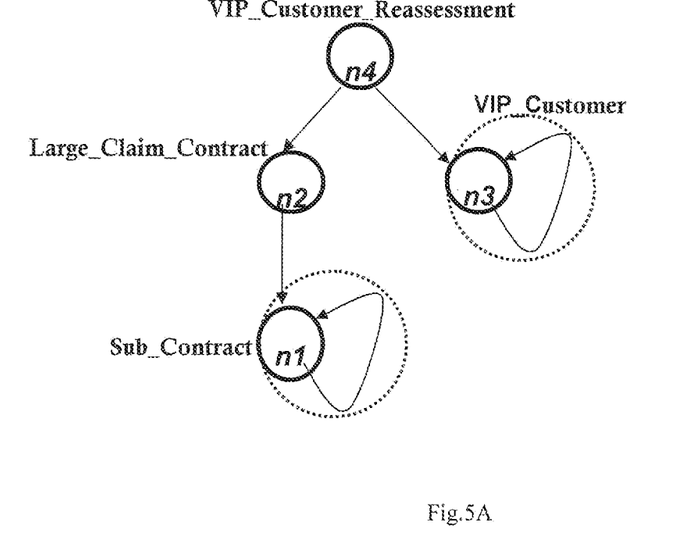
FIGS. 5A-5F show an example for determining node to be materialized according to an embodiment of the invention.
Figure 5B:
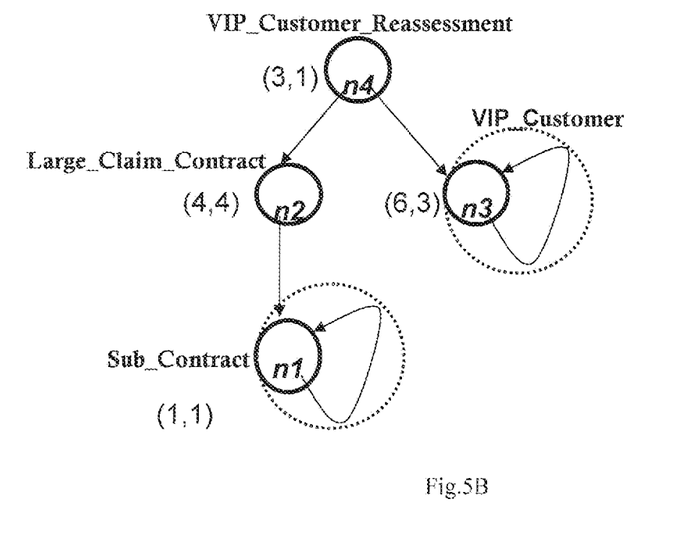

The original dependency graph as shown in FIG. 5A can be obtained from basic table in the database and the meanings of defined 4 rule predicates. The original dependency graph as shown in FIG. 5A is generated by the reasoning system according to expressions defined by rule predicate. The original dependency graph illustrates 4 nodes that correspond to defined 4 rule predicates respectively, and 4 node identifiers n1, n2, n3, n4 are used to represent 4 rule predicates "Sub_Contract," "Large_Claim_Contract," "VIP_Customer" and "VIP_Customer_Reassessment" respectively. Specifically, assuming that the update frequencies of 4 basic tables are known as follows: fu(Contract)=3, fu(Contract_Relationship)=1, fu(Claim)=4, fu(Client)=6. Also, assuming that the query frequencies of 4 rule predicates are known as follows: fq(Sub_Contract)=1, fq(Large_Claim_Contract)=4, fq(VIP_Customer)=3, fq(VIP_Customer_Reassessment)=1. Initially, the query frequencies and update frequencies of these 4 rule predicates are initialized, and the initialized results are shown in FIG. 5B. Value on the left of the brackets represents update frequency, and value on the right represents query frequency.

When the initialization is over, it can be found that nodes n1 and n3 compose a strongly connected sub-graph, because each of rule predicates "Sub_Contract" and "VIP_Customer" may depend on itself (seen from defined expression). Thus, dashed circles are used to surround these two strongly connected sub-graphs containing only one rule predicate in FIG. 5B, and are replaced with dummy nodes. The results of initializing these two dummy nodes are also illustrated in FIG. 5B (since only one rule predicate is included, the result of initialization is the same as the result of initialization of rule predicates that are contained).

Figure 5C:
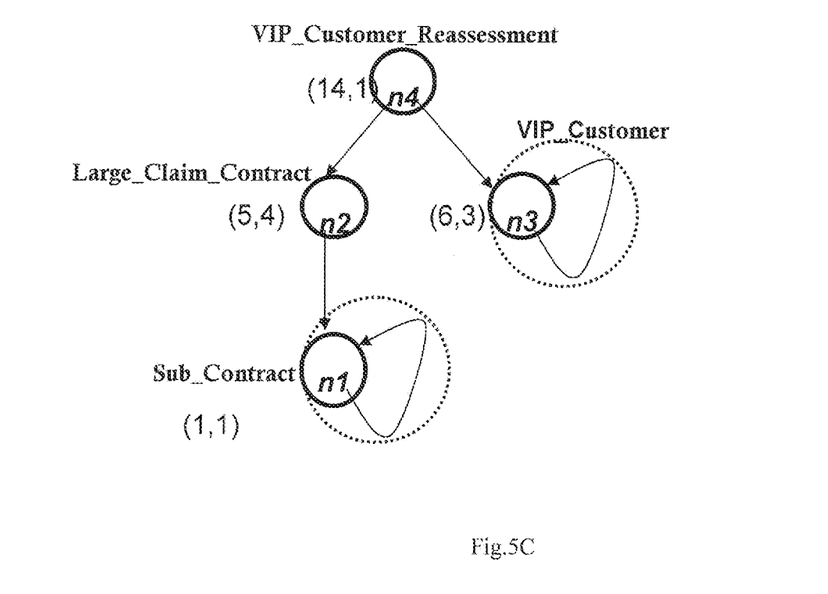

Next, the update frequencies of 4 nodes are calculated, and according to the method as shown in FIG. 2 and the description thereof, it can be calculated that, the update frequency of dummy node n1 is 1 (remaining unchanged), the update frequency of rule predicate node n2 is 1+4=5, the update frequency of dummy node n3 is 6 (remaining unchanged), the update frequency of rule predicate node n4 is 3+4+1+6=14. The calculated update frequencies are shown in FIG. 5C (query frequency remaining unchanged).

Figure 5D:
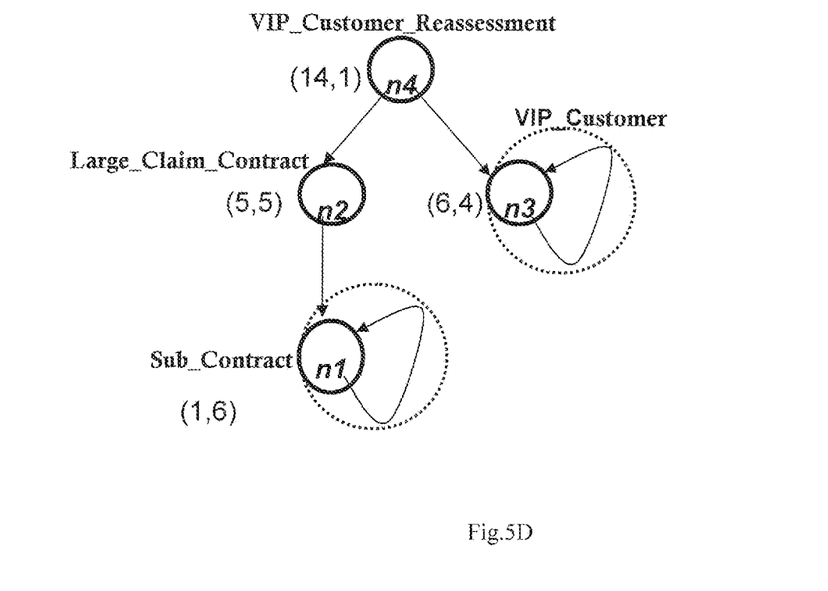

Next, the query frequencies of 4 nodes are calculated, and according to the method as shown in FIG. 2 and the description thereof, it can be calculated that, the query frequency of dummy node n1 is 1+4+1=6, the query frequency of rule predicate node n2 is 4+1=5, the query frequency of dummy node n3 is 3+1=4, the query frequency of rule predicate node n4 is 1 (remaining unchanged). The calculated update frequencies and query frequencies are shown in FIG. 5D.

Figure 5E:
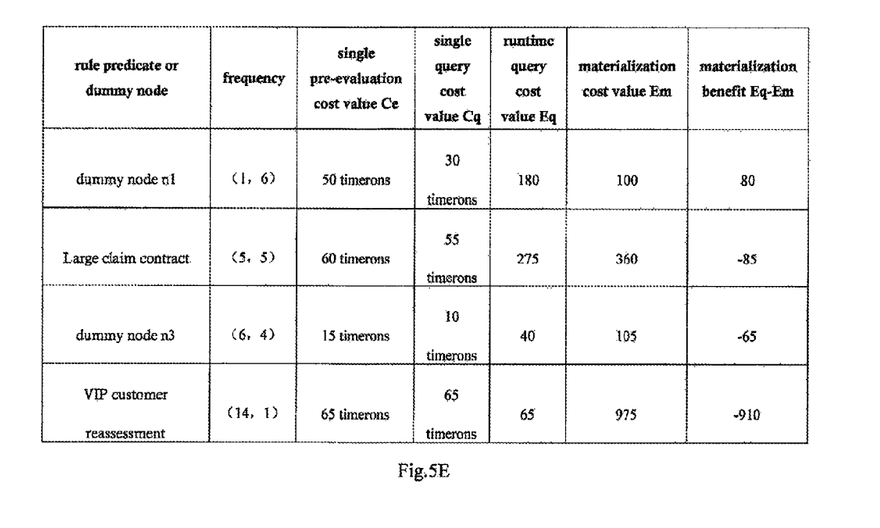
Figure 5F:
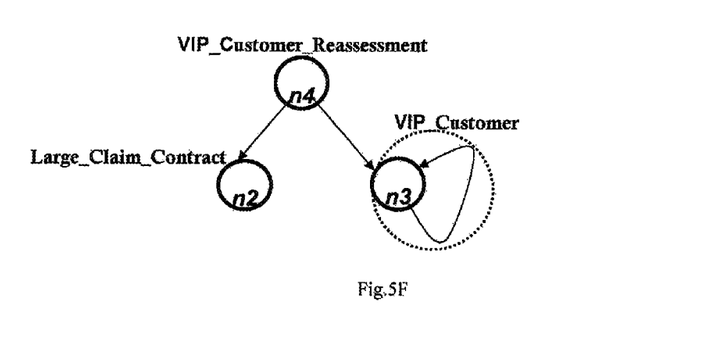

Next, it is determined which rule predicate(s) or dummy node(s) of 4 rule predicates or dummy nodes by using table shown in FIG. 5E. The table in FIG. 5E shows the update frequency, query frequency, single pre-evaluation cost value Ce, single query cost value Cq, materialization cost value Em, runtime query cost value Eq, materialization benefit Eq−Em. Herein, the single pre-evaluation cost value Ce and single query cost value Cq are obtained according to evaluation of operation cost of database, or are obtained from the system log. The materialization cost value Em is calculated according to formula (1), the runtime query cost value Eq calculated according to formula (2). Assuming that the set threshold is 10, it can be determined that only dummy node n1 (that is "Sub_Contract") should be materialized by comparing value Eq−Em of each rule predicate or dummy node and 10.

After it is determined that the dummy node n1 should be materialized, the dummy node n1 is deleted in the dependency graph, and n1 (Sub_Contract) is materialized, and a materialization table corresponding to rule predicate "Sub_Contract" is generated. In this way, in subsequent query, the materialization table of "Sub_Contract" can be invoked for querying. The dependency graph which deletes node n1 to be materialized is shown as FIG. 5F. Thus, all the operations of determining rule predicate or dummy that should be materialized in the example are completed. It should be noted that, if the determined node to be materialized is dummy node, it means that all rule predicates contained in the strongly connected sub-graph corresponding to the dummy node are needed to be materialized, wherein a materialization table is generated for each of rule predicates but not for a dummy node. It can be seen from the examples shown in FIG. 5A-5F that, by using the method of the invention, a selective mixing method of materialization and reasoning may be implemented, thus not only the return time of result of runtime query is saved, but also a defect of frequent and troublesome re-materialization due to data update can't occur.

Figure 6:
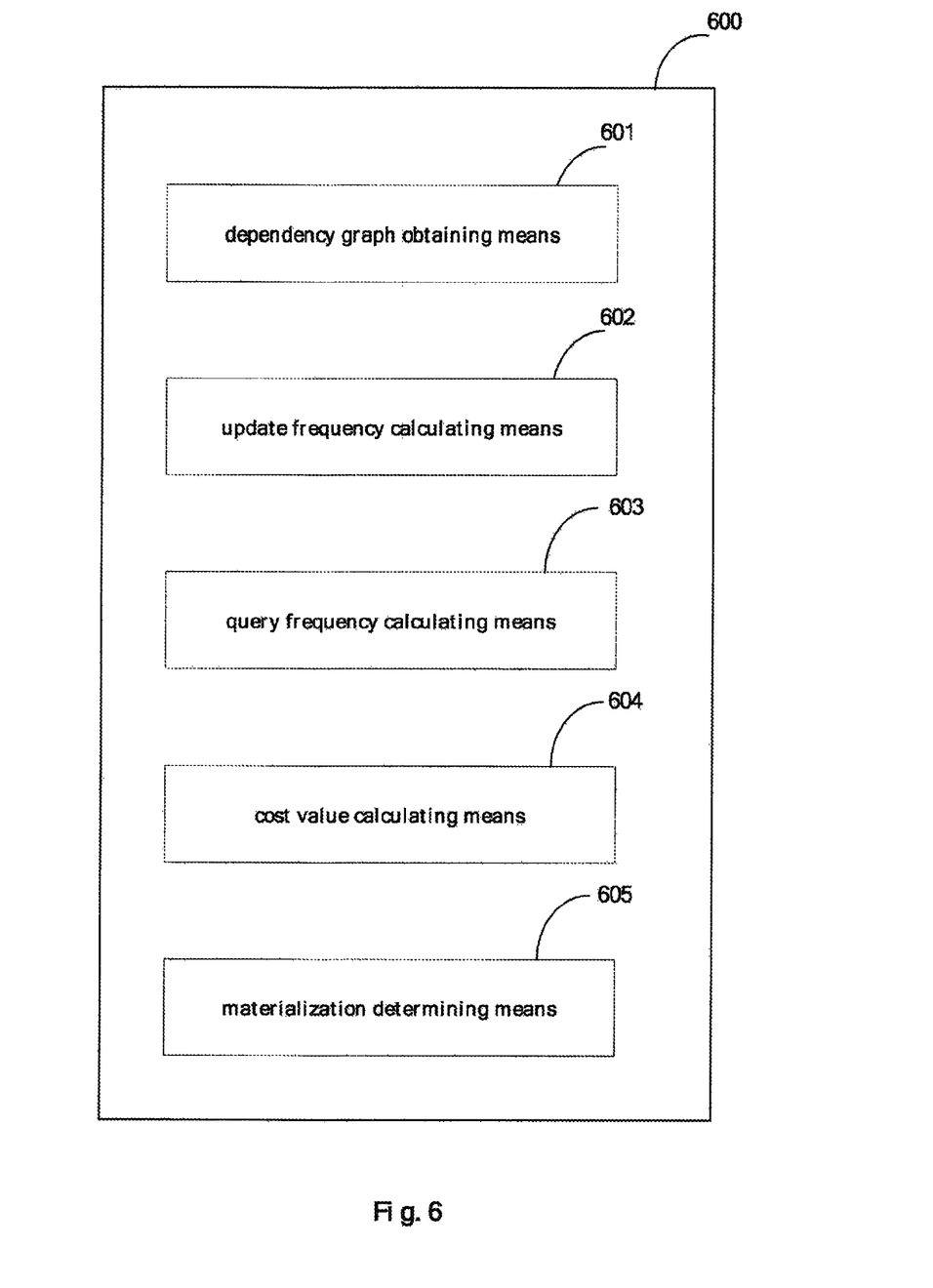
FIG. 6 shows a system for determining node to be materialized according to an embodiment of the invention.

FIG. 6 shows a system for determining node to be materialized according to an embodiment of the invention. The system is generally represented by 600. Specifically, the system 600 includes a dependency graph obtaining means 601 for obtaining a dependency graph of rule predicates without strongly connected sub-graph; update frequency calculating means 602 for calculating an update frequency of rule predicate; query frequency calculating means 603 for calculating a query frequency of rule predicate; cost value calculating means 604 for calculating a materialization cost value and a runtime query cost value of the rule predicate; and determining means 605 for determining node to be materialized.

Using methods and systems of the invention, a node to be materialized is selected, such that the calculated reasoning result can be directly used during subsequent runtime query without runtime reasoning, thereby improving return speed of query result. At the same time, using methods and systems of the invention, rule predicate or node can be selectively (instead of all rule predicates or nodes) performed materialization reasoning, and this can also avoid disadvantage of frequent update of materialization reasoning result due to frequent data update.

Those skilled in the art will understand, from the description of detailed embodiments above, the above systems, means and methods may be implemented by using computer executable instructions and/or containing in processor control codes, for example, such codes are provided on carrier medium such as magnetic disk, CD or DVD-ROM, programmable memory such as read-only memory (firmware) or data carrier such as optical or electric signal carrier. The means, server and its unit of the embodiment may be implemented by semiconductor such as integrated circuit or gate array in super large scale, such logic chip, transistor etc, or hardware circuit of programmable hardware device such as field programmable gate array, programmable logic device etc, and by software executed by various types of processors, and by a combination of the above hardware circuit and software.

Thus, having reviewed the disclosure herein, the skilled artisan will appreciate that aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Distinct software modules for carrying out aspects of embodiments of the invention can be, in at least some cases, embodied on a computer readable storage medium The means mentioned herein can include (i) hardware module(s), (ii) software module(s), or (iii) a combination of hardware and software modules; any of (i)-(iii) implement the specific techniques set forth herein, and the software modules are stored in a computer readable medium (or multiple such media).

Although the systems and methods of handling local file by using remote applications are described in detail, the invention doesn't be limited thereto. Those skilled in the art can change, substitute and modify the invention from the teachings without departing from the spirit and scope of the invention. It should be understood that, all such changes, substitutions and modifications still fall into the protection scope of the invention. The protection scope of the invention is defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining a rule predicate to be materialized, comprising:
    obtaining a dependency graph comprising a plurality of nodes, wherein each node corresponds to one or more rule predicates, and the nodes of the dependency graph are not strongly connected to one another, wherein the dependency graph indicates dependencies among the plurality of nodes;
    calculating an update frequency of the plurality of nodes in the dependency graph;
    calculating a query frequency of the plurality of nodes in the dependency graph;
    calculating a runtime query cost value and a materialization cost value of the plurality of nodes based on the query frequency and the update frequency; and
    determining at least one node of the plurality of nodes to be materialized based on the runtime query cost value and the materialization cost value, wherein at least one of the rule predicates, corresponding to the at least one node to be materialized, comprises the rule predicate to be materialized;
        wherein calculating the runtime query cost value and the materialization cost value based on the query frequency and the update frequency further comprises:
        setting a single reassessment cost value $C_e$ of the node;
        setting a single query cost value $C_q$ of the node;
        calculating the materialization cost value $E_m$ of the node by using formula $E_m = C_e + n.UF * C_e$, wherein $n.UF$ represents the update frequency of the node; and
        calculating the runtime query cost value of the node $E_q$ by using formula $E_q = n.QF * C_q$, wherein $n.QF$ represents the query frequency of the node.

2. A system for determining rule predicates to be materialized, including:
    a memory device storing a plurality of instructions embodying the system and an a dependency graph comprising a plurality of nodes, wherein each node corresponds to one or more rule predicates, and the nodes of the dependency graph are not strongly connected to one another, wherein the dependency graph indicates dependencies among the plurality of nodes; and
    a processor configured to receive the application and execute the plurality of instructions to perform a method comprising:
        calculating an update frequency of the plurality of nodes in the dependency graph;
        calculating a query frequency of the plurality of nodes in the dependency graph;
        calculating a runtime query cost value and a materialization cost value of the plurality of the nodes based on the query frequency and the update frequency; and
    determining at least one node of the plurality of nodes to be materialized based on a difference of the runtime query cost value and the materialization cost value of the node, wherein at least one of the rule predicates corresponding to the at least one node to be materialized, comprises the rule predicate to be materialized;
        wherein calculating the runtime query cost value further comprises:
        setting a single reassessment cost value $C_e$ of the node;
        setting a single query cost value $C_q$ of the node;
        calculating the materialization cost value $E_m$ of the node by using formula $E_m = C_e + n.UF * C_e$, wherein $n.UF$ represents the update frequency of the node; and
        calculating the runtime query cost value of the node $E_q$ by using formula $E_q = n.QF * C_q$, wherein $n.QF$ represents the query frequency of the node.

* * * * *